United States Patent
Chang

(10) Patent No.: US 11,146,742 B2
(45) Date of Patent: Oct. 12, 2021

(54) METHOD AND APPARATUS FOR MULTI-EXPOSURE PHOTOGRAPHY, AND STORAGE MEDIUM

(71) Applicant: BEIJING XIAOMI MOBILE SOFTWARE CO., LTD., Beijing (CN)

(72) Inventor: Binglin Chang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 82 days.

(21) Appl. No.: 16/744,698

(22) Filed: Jan. 16, 2020

(65) Prior Publication Data

US 2021/0099654 A1 Apr. 1, 2021

(30) Foreign Application Priority Data

Sep. 27, 2019 (CN) .......................... 201910923409.3

(51) Int. Cl.
*H04N 5/265* (2006.01)
*G06T 7/30* (2017.01)
(Continued)

(52) U.S. Cl.
CPC ........... *H04N 5/265* (2013.01); *G06F 3/0488* (2013.01); *G06K 9/2054* (2013.01); *G06T 5/50* (2013.01);
(Continued)

(58) Field of Classification Search
CPC .... H04N 5/265; H04N 5/2356; H04N 5/2625; H04N 5/23222; H04N 5/232945;
(Continued)

(56) References Cited

U.S. PATENT DOCUMENTS 8,199,125 B2 * 6/2012 Misawa .............. G06F 3/04883
345/173
8,275,215 B2 * 9/2012 Mei .......................... G06T 11/60
382/284
(Continued)

FOREIGN PATENT DOCUMENTS

CN 102761692 A 10/2012
CN 102761695 A 10/2012
(Continued)

OTHER PUBLICATIONS

Chen, Liang-Chieh, et al. "Deeplab: Semantic image segmentation with deep convolutional nets, atrous convolution, and fully connected crfs." IEEE transactions on pattern analysis and machine intelligence 40.4 (2017); May 12, 2017.

(Continued)

*Primary Examiner* — Michael S Osinski
(74) *Attorney, Agent, or Firm* — Syncoda LLC; Feng Ma

(57) ABSTRACT

A method for multi-exposure photography includes: receiving a screen touch operation, and determining a collected frame corresponding to the screen touch operation, a subject area image corresponding to the screen touch operation, and an alignment parameter of the subject area image corresponding to the screen touch operation; acquiring a currently collected frame in real time; synthesizing the subject area image corresponding to the screen touch operation, or the subject area image corresponding to the screen touch operation together with subject area images corresponding to all historical screen touch operations into the currently collected frame according to corresponding alignment parameters, taking the synthesized image to be an image with a multi-exposure processed effect and displaying the image with the multi-exposure processed effect; and taking an image with a multi-exposure processed effect generated after (Continued)

a final screen touch operation to be a multi-exposed result image.

20 Claims, 6 Drawing Sheets

(51) Int. Cl.
*G06F 3/0488* (2013.01)
*G06K 9/20* (2006.01)
*G06T 5/50* (2006.01)

(52) U.S. Cl.
CPC ...... *G06T 7/30* (2017.01); *G06T 2207/20084* (2013.01); *G06T 2207/20104* (2013.01); *G06T 2207/20221* (2013.01)

(58) Field of Classification Search
CPC .. H04N 5/2621; H04N 5/23216; H04N 5/272; H04N 5/23219; H04N 5/232935; G06T 7/30; G06T 7/194; G06T 7/11; G06T 7/20; G06T 7/2015; G06T 5/50; G06T 2207/20084; G06T 2207/20104; G06T 2207/20221; G06T 2207/10016; G06T 11/60; G06F 3/0488; G06F 2203/04808; G06K 9/2054

See application file for complete search history.

(56) References Cited

U.S. PATENT DOCUMENTS

| | | | | |
|---|---|---|---|---|
| 8,976,255 | B2* | 3/2015 | Matsuoto | H04N 5/272 348/218.1 |
| 9,665,764 | B2* | 5/2017 | Baek | H04N 5/23216 |
| 10,950,053 | B2* | 3/2021 | Fukuchi | G06T 19/006 |
| 2002/0071042 | A1* | 6/2002 | Enomoto | H04N 5/232933 348/222.1 |
| 2005/0129324 | A1* | 6/2005 | Lemke | H04N 1/387 382/254 |
| 2007/0086675 | A1* | 4/2007 | Chinen | G06T 7/11 382/284 |
| 2011/0109763 | A1* | 5/2011 | Han | G06T 11/60 348/222.1 |
| 2011/0122080 | A1* | 5/2011 | Kanjiya | G06F 3/04883 345/173 |
| 2012/0057051 | A1 | 3/2012 | Ito | |
| 2012/0274813 | A1* | 11/2012 | Ishibashi | H04N 5/235 348/239 |
| 2013/0235224 | A1* | 9/2013 | Park | H04N 5/2621 348/218.1 |
| 2014/0320701 | A1 | 10/2014 | Nonaka et al. | |
| 2015/0070523 | A1 | 3/2015 | Chao | |
| 2015/0221066 | A1* | 8/2015 | Kobayashi | G06T 7/194 382/284 |
| 2015/0248590 | A1* | 9/2015 | Li | G06T 7/194 382/103 |
| 2015/0319373 | A1 | 11/2015 | Shukla et al. | |
| 2016/0227108 | A1 | 8/2016 | Yokokawa et al. | |
| 2016/0364110 | A1* | 12/2016 | Matsuda | G06F 3/04886 |
| 2017/0115869 | A1* | 4/2017 | Nomura | G06F 3/04845 |
| 2018/0048808 | A1 | 2/2018 | Yokokawa et al. | |
| 2018/0075065 | A1* | 3/2018 | Shah | G06T 11/60 |
| 2018/0255232 | A1* | 9/2018 | Takahashi | G06T 11/60 |
| 2018/0352151 | A1 | 12/2018 | Yokokawa et al. | |
| 2018/0356933 | A1* | 12/2018 | Enssle | G06F 3/011 |

FOREIGN PATENT DOCUMENTS

| | | |
|---|---|---|
| CN | 103856718 A | 6/2014 |
| CN | 104113692 A | 10/2014 |
| CN | 103327253 B | 5/2015 |
| CN | 106851125 A | 6/2017 |
| CN | 107077720 A | 8/2017 |
| CN | 104243819 B | 2/2018 |
| CN | 108419007 A | 8/2018 |
| CN | 108540713 A | 9/2018 |
| CN | 108777766 A | 11/2018 |
| EP | 2869239 A2 | 5/2015 |

OTHER PUBLICATIONS

Baker, Simon, and Iain Matthews. "Lucas-kanade 20 years on: A unifying framework." International journal of computer vision 56.3 (2004): 221-255.

Agarwal, Anubhav, C. V. Jawahar, and P. J. Narayanan. "A survey of planar homography estimation techniques." Centre for Visual Information Technology, Tech. Rep. IIIT/TR/2005/12 (2005).

European Search Report in the European application No. 20153132.4, dated Jun. 19, 2020.

First Office Action of the Chinese application No. 201910923409.3, dated Sep. 30, 2020.

Notice of Allowance of the Chinese application No. 201910923409.3, dated Jun. 2, 2021.

* cited by examiner

METHOD AND APPARATUS FOR MULTI-EXPOSURE PHOTOGRAPHY, AND STORAGE MEDIUM

CROSS-REFERENCE TO RELATED APPLICATION

This application claims priority to Chinese patent application No. 201910923409.3 filed on Sep. 27, 2019, the disclosure of which is hereby incorporated by reference in its entirety.

BACKGROUND

Typically, the multi-exposure function of a digital camera is in fact implemented through a process of synthesizing multiple pictures into one picture in a certain way in real time. For example, a human body profile can be synthesized with other background to reach a special artistic effect. FIG. 1 illustrates a synthesized picture subjected to multi-exposure processing in a first application scenario. Alternatively, pictures to be synthesized contain a same background but multiple subjects associated with a same person, and the positions of the subjects in the background are different among the pictures, to reach an interesting effect of a synthesized picture containing multiple doppelgangers of the same person.

SUMMARY

The present disclosure generally relates to the technology of multi-exposure photography, and more specifically to a method and apparatus for multi-exposure photography, and a storage medium.

According to a first aspect of embodiments of the disclosure, a method for multi-exposure photography is provided, including:

receiving a screen touch operation;

determining a collected frame corresponding to the screen touch operation;

determining, according to a first rule, a subject area image corresponding to the screen touch operation from the collected frame corresponding to the screen touch operation;

determining, according to a second rule, an alignment parameter of the subject area image corresponding to the screen touch operation;

acquiring a currently collected frame in real time;

when determining that the screen touch operation is the first received screen touch operation, synthesizing, according to the alignment parameter of the subject area image corresponding to the screen touch operation, the subject area image corresponding to the screen touch operation into the currently collected frame, taking the synthesized image to be an image with a multi-exposure processed effect and displaying the image with the multi-exposure processed effect; or when determining that the screen touch operation is not the first received screen touch operation, synthesizing, according to corresponding alignment parameters, the subject area image corresponding to the screen touch operation and subject area images corresponding to all historical screen touch operations into the currently collected frame, taking the synthesized image to be the image with the multi-exposure processed effect and displaying the image with the multi-exposure processed effect; and determining an image with a multi-exposure processed effect from the images with the multi-exposure processed effect, which are generated after a final screen touch operation, to be a multi-exposed result image.

According to a second aspect of embodiments of the disclosure, an apparatus for multi-exposure photography is provided, including:

a processor; and a memory, configured to store instructions executable by the processor, wherein the processor is configured to:

receive a screen touch operation;

determine a collected frame corresponding to the screen touch operation;

determine, according to a first rule, a subject area image corresponding to the screen touch operation from the collected frame corresponding to the screen touch operation;

determine, according to a second rule, an alignment parameter of the subject area image corresponding to the screen touch operation;

acquire a currently collected frame in real time;

when determining that the screen touch operation is the first received screen touch operation, synthesize, according to the alignment parameter of the subject area image corresponding to the screen touch operation, the subject area image corresponding to the screen touch operation into the currently collected frame, take the synthesized image to be an image with a multi-exposure processed effect and display the image with the multi-exposure processed effect; or when determining that the screen touch operation is not the first received screen touch operation, synthesize, according to corresponding alignment parameters, the subject area image corresponding to the screen touch operation and subject area images corresponding to all historical screen touch operations into the currently collected frame, take the synthesized image to be the image with the multi-exposure processed effect and display the image with the multi-exposure processed effect; and determine an image with a multi-exposure processed effect from the images with the multi-exposure processed effect, which are generated after a final screen touch operation, to be a multi-exposed result image.

According to a third aspect of embodiments of the disclosure, a non-transitory computer-readable storage medium is provided, wherein instructions in the storage medium, when executed by a processor of a mobile terminal, enable the mobile terminal to execute a method for multi-exposure photography, comprising:

receiving a screen touch operation;

determining a collected frame corresponding to the screen touch operation;

determining, according to a first rule, a subject area image corresponding to the screen touch operation from the collected frame corresponding to the screen touch operation;

determining, according to a second rule, an alignment parameter of the subject area image corresponding to the screen touch operation;

acquiring a currently collected frame in real time;

when determining that the screen touch operation is the first received screen touch operation, synthesizing, according to the alignment parameter of the subject area image corresponding to the screen touch operation, the subject area image corresponding to the screen touch operation into the currently collected frame, taking the synthesized image to be an image with a multi-exposure processed effect and displaying the image with the multi-exposure processed effect; or when determining that the screen touch operation is not the first received screen touch operation, synthesizing, according to corresponding alignment parameters, the subject area image corresponding to the screen touch operation and subject area images corresponding to all historical screen touch operations into the currently collected frame, taking the synthesized image to be the image with the multi-exposure processed effect and displaying the image with the multi-exposure processed effect; and determining an image with a multi-exposure processed effect from the images with the multi-exposure processed effect, which are generated after a final screen touch operation, to be a multi-exposed result image.

It should be understood that the general description above and detailed description below are merely exemplary and explanatory, and are not intended to restrict the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
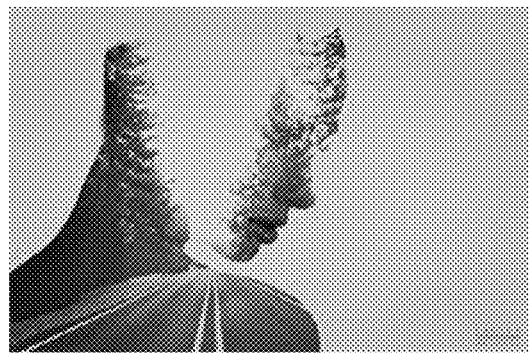
FIG. 1 illustrates a synthesized picture subjected to multi-exposure processing in a first application scenario.

Exemplary embodiments (examples of which are illustrated in the accompanying drawings) are elaborated below.

The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Synthesis processing may be implemented by simply adding the pictures in a fixed proportion. Specifically, multiple pictures are photographed consecutively, with the photographed multiple pictures containing the same background; during preview, the multiple pictures which have not been aligned are simply synthesized averagely for display; when the photography of all the pictures is completed, all of the pictures are aligned in an off-line manner; the area where a picture subject is located is determined according to a difference between pictures, and the subjects are extracted separately to obtain a final result, i.e., obtaining a multi-exposed photography picture.

It can be seen from the description of the process above that, in the related art, during the preview of multi-exposure photography, average synthesization of multiple pictures cannot be performed until the photography of all the pictures is completed.

Figure 2:
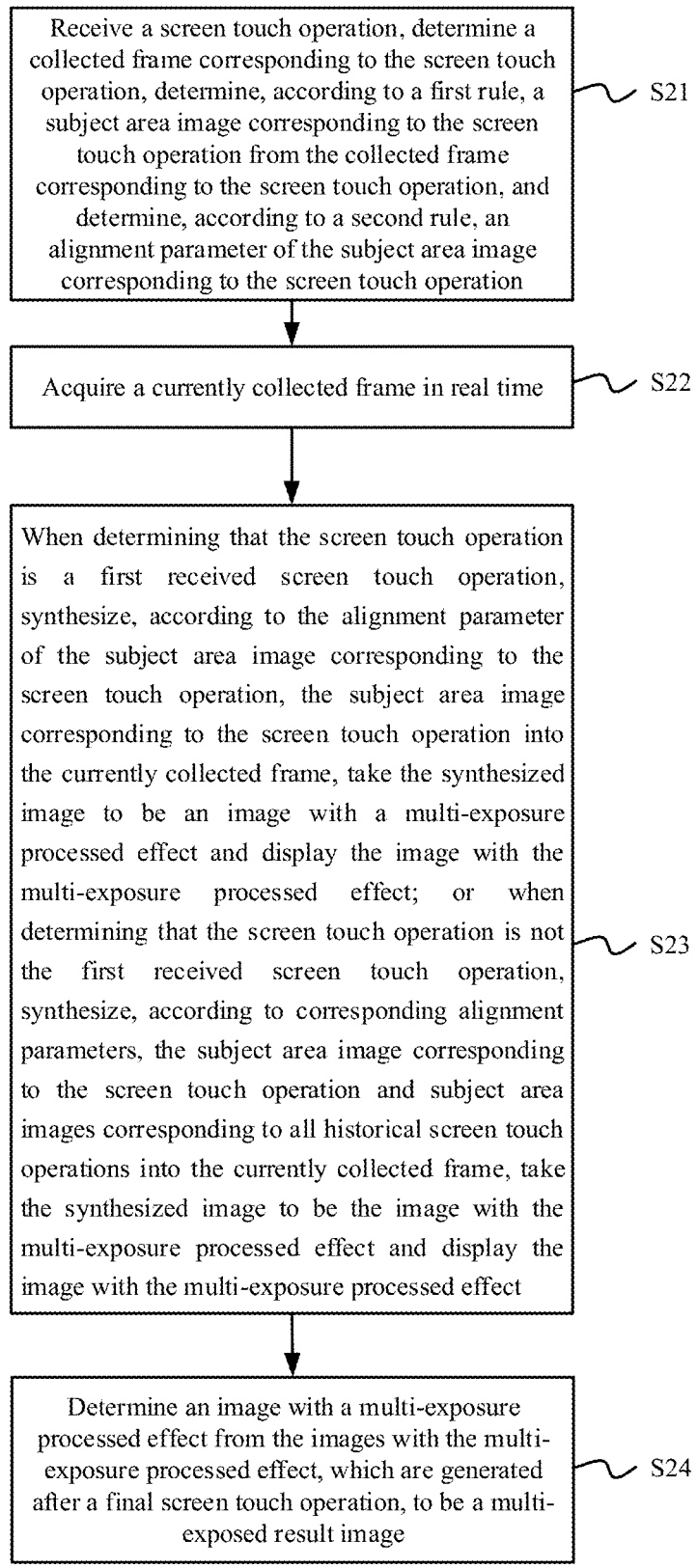
FIG. 2 illustrates a flowchart of a method for multi-exposure photography according to some embodiments of the disclosure.

FIG. 2 illustrates a flowchart of a method for multi-exposure photography according to some embodiments of the disclosure. The method may be applied to a terminal. As illustrated in FIG. 2, the method includes the following blocks.

In block S21, a screen touch operation is received, a collected frame corresponding to the screen touch operation is determined, a subject area image corresponding to the screen touch operation is determined from the collected frame corresponding to the screen touch operation according to a first rule, and an alignment parameter of the subject area image corresponding to the screen touch operation is determined according to a second rule.

In block S22, a currently collected frame is acquired in real time.

In block S23, when determining that the screen touch operation is the first received screen touch operation, the subject area image corresponding to the screen touch operation is synthesized into the currently collected frame according to the alignment parameter of the subject area image corresponding to the screen touch operation, the synthesized image is taken to be an image with a multi-exposure processed effect, and the image with the multi-exposure processed effect is displayed. When determining that the screen touch operation is not the first received screen touch operation, the subject area image corresponding to the screen touch operation and subject area images corresponding to all historical screen touch operations are synthesized into the currently collected frame according to corresponding alignment parameters, the synthesized image is taken to be the image with the multi-exposure processed effect, and the image with the multi-exposure processed effect is displayed.

In block S24, an image with a multi-exposure processed effect is determined to be a multi-exposed result image from the images with the multi-exposure processed effect, which are generated after a final screen touch operation.

In the above block S21, the screen touch operation may include various operations. For example, the screen touch operation may be a screen clicking operation, a screen long-press operation, an operation of sliding on a screen or the like. When the screen touch operation is a sliding operation, the sliding track may be regular or irregular. The sliding track may include any open and/or closed curve. The curve herein includes a straight line, and a broken line with more than one breakpoint.

In this embodiment, the recognized subject area image may be a human, an animal, a plant, a still article or the like. Since a recognition operation will be conducted each time a screen touch operation is received, multiple subject area images may be recognized. When multiple subject area images are recognized, the subject area image recognized each time may be associated with a same subject. For example, the subject area image recognized each time may be associated with the same human. The subject area image recognized each time may be associated with different subjects as well. For example, the subject area image recognized at a first time is associated with a human, and the subject area image recognized at a second time is associated with a still article, etc.

In the above block S23, when determining that the screen touch operation is not the first received screen touch operation, the subject area image corresponding to the screen touch operation and subject area images corresponding to all historical screen touch operations are synthesized into the currently collected frame according to corresponding alignment parameters. The subject area image corresponding to the screen touch operation may be synthesized into the currently collected frame according to the alignment parameter of the subject area image corresponding to the screen touch operation determined in block S21. The subject area images corresponding to all historical screen touch operations prior to receiving the screen touch operation may be synthesized into the currently collected frame successively according to the alignment parameters of the subject area images corresponding to the respective historical screen touch operations. During the synthesis operation, the subject area image corresponding to the screen touch operation and the subject area images corresponding to all the historical screen touch operations are synthesized into a same collected frame.

In the above block S24, the multi-exposed result image may be determined in many ways. By way of example, when determining that the multi-exposure photography has ended, the subject area image corresponding to the final screen touch operation and the subject area images corresponding to all the historical screen touch operations may be synthesized into the collected frame acquired at the moment of receiving the final screen touch operation, and the synthesized image obtained at this time is taken to be the multi-exposed result image. When determining that the multi-exposure photography ends, the subject area image corresponding to the final screen touch operation and the subject area images corresponding to all the historical screen touch operations may also be synthesized into the collected frame acquired at the moment of determining that the multi-exposure photography ends, and the synthesized image obtained at this time is taken to be the multi-exposed result image.

It can be seen from the above embodiment that, in the technical solution according to embodiments of the disclosure, each time a screen touch operation is received, an operation of recognizing a subject area image and an operation of synthesizing the recognized subject area image will be triggered. However, in conventional multi-exposure photography, all the subjects involved in synthesis processing are extracted from photographed pictures (referred to hereinafter as original pictures) respectively, that is to say, each extracted subject corresponds an original picture. Hence, a collected frame corresponding to a screen touch operation herein is equivalent to an original picture in multi-exposure photography, and the screen touch operation is equivalent to an operation of triggering the photography of the original picture in the multi-exposure photography. The subject area image recognized according to the screen touch operation is equivalent to a subject extracted from the current original picture. All the subject area images recognized according to previously received screen touch operations are equivalent to subjects extracted from previously photographed original pictures. It can be seen therefrom that, in this embodiment, the image with the multi-exposure processed effect is equivalent to a real-time preview picture generated each time an original picture for multi-exposure is photographed. That is to say, during multi-exposure photography, the multi-exposure processed effect of a currently photographed original picture and previously photographed original pictures can be previewed in real time each time an original picture is photographed, without the need of conducting an average synthesis operation to obtain a multi-exposed effect picture after the photography of all the pictures is completed. It can be seen that the technical solution of this embodiment provides a user with the function of previewing a multi-exposure processed effect in real time more conveniently and more intuitively. The multi-exposed result image obtained at the end of multi-exposure photography operations is one of the images with the multi-exposure processed effect previewed in real time; that is, the photography effect of "what you see is what you get" is achieved, improving user experience. Moreover, in the technical solution of this embodiment, the means of triggering photography by a screen touch operation is totally different from the means of adding a picture by pressing a shutter in the related art, and triggering photography by a screen touch operation is more convenient for a user's photography operation and improves user experience.

Another method for multi-exposure photography is further provided in this embodiment. The first rule involved in the method may include: determining the subject area image corresponding to the screen touch operation according to at least one of the screen touch operation or an object image segmentation approach.

It can be seen from the above description that the approach to recognize a subject area image in an original picture in the technical solution of this embodiment may at least include the following three approaches.

A subject area image corresponding to a screen touch operation is determined according to the screen touch operation. That is to say, an image area corresponding to the screen touch operation initiated by a user can be recognized as the subject area image. For example, when the screen touch operation initiated by the user includes a sliding operation, the image area corresponding to the screen touch operation may be determined according to a sliding track, and this image area may be extracted as the subject area image. According to this approach, the screen touch operation initiated by the user is considered as main basis for the recognition operation, so that the user's requirement of autonomously selecting a subject to be selected can be better satisfied, improving user experience.

The subject area image corresponding to the screen touch operation is determined according to an object image segmentation approach. That is to say, an object image segmentation approach is used to automatically recognize the subject area image from the collected frame corresponding to the screen touch operation, equivalent to recognizing the subject area image from the original picture of which the photography is triggered by the screen touch operation. The object image segmentation approach is a commonly used object segmentation technique, which will not be described in detail. In this approach, the function of automatically recognizing a subject is realized based on the object image segmentation approach, simplifying the flow of recognition, and improving the efficiency of recognition.

The subject area image corresponding to the screen touch operation is determined according to the screen touch operation and the object image segmentation approach. That is to say, the screen touch operation initiated by the user and the object image segmentation approach are combined to serve as a basis for the recognition operation. In this approach, during the recognition of the subject, the advantages of the object image segmentation approach and the user autonomously selecting a subject to be synthesized are combined, so that the recognition of the subject area image is more accurate and better fits user requirements while ensuring the efficiency of recognition.

Figure 3:
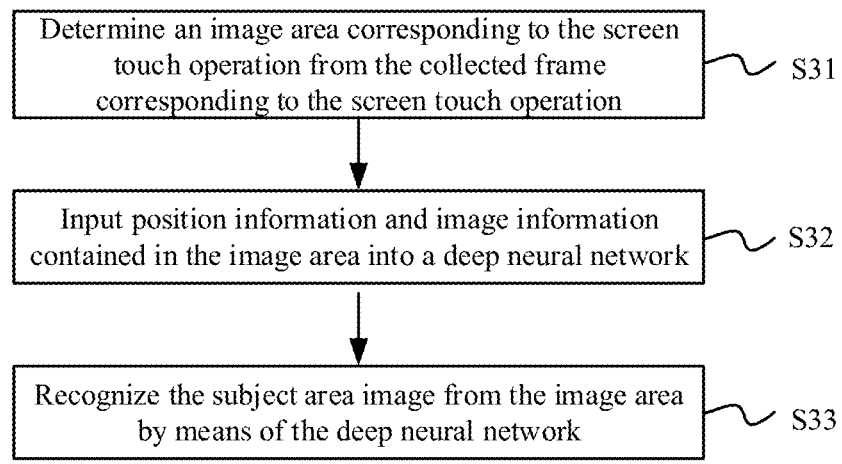
FIG. 3 illustrates a flowchart of the process of determining a subject area image in response to a screen touch operation and according to an object image segmentation approach in a method for multi-exposure photography according to some embodiments of the disclosure.

Another method for multi-exposure photography is further provided in this embodiment. In the method, the process of determining a subject area image corresponding to a screen touch operation according to the screen touch operation and an object image segmentation approach, as illustrated in FIG. 3, at least includes the following operations.

In block S31, an image area corresponding to the screen touch operation is determined from the collected frame corresponding to the screen touch operation.

In the above block S31, image area corresponding to the screen touch operation may be determined in a random way. For example, when the screen touch operation includes a clicking operation, the coordinates, in the coordinate system of the collected frame corresponding to the screen touch operation, of the clicking position of the clicking operation may be acquired, which are referred to as the coordinates of the clicking position for short. An area of a set size which contains the coordinates of the clicking position is determined as an image area corresponding to the screen touch operation. The set size may be pre-configured by the system, or may be configured by the user autonomously. Furthermore, when the screen touch operation includes a long-press operation, the way to determine an image area corresponding to the long-press operation is substantially the same as that of determining the image area corresponding to the clicking operation, which will not be described here.

For another example, when the screen touch operation includes a sliding operation, the coordinates, in the coordinate system of the collected frame corresponding to the screen touch operation, of the sliding start point of the sliding operation are referred to as the coordinates of the sliding start point for short. The coordinates, in the coordinate system of the collected frame corresponding to the screen touch operation, of all the sliding points during sliding are referred to as the coordinates of the sliding points for short. The coordinates, in the coordinate system of the collected frame corresponding to the screen touch operation, of the sliding end point are referred to as the coordinates of the sliding end point for short. When the sliding track is an open curve, an area of a set size which contains the coordinates of the clicking start point, the coordinates of all the sliding points and the coordinates of the sliding end point may be determined to be an image area corresponding to the screen touch operation. When the sliding track is a closed curve, the coordinates of the clicking start point, the coordinates of all the sliding points and the coordinates of the sliding end point may be taken to be a boundary to divide the collected frame corresponding to the screen touch operation into an area inside the closed curve and an area outside the closed curve. An area of a set size which contains the area inside the closed curve may be determined to be an image area corresponding to the screen touch operation. The set size may be pre-configured by the system, or may be configured by the user autonomously.

In block S32, position information and image information contained in the image area are input into a deep neural network.

In the above block S32, the position information contained in the image area may include the coordinate range of the image area in the coordinate system of the collected frame corresponding to the screen touch operation. The image information contained in the image area may include pixel information, light/shadow information, etc. of the image area. The pixel information may include any one or more of hue, saturation and brightness. The light/shadow information may include all information having a direct effect on light rays, for example, brightness and contrast.

In block S33, the subject area image is recognized from the image area by means of the deep neural network.

In the above block S33, any object segmentation approach may be employed in the deep neural network to recognize the subject area image, which will not be particularly specified.

It can be seen that, according to the technical solution of this embodiment, an area to be recognized can be accurately positioned according to a user's screen touch operation, and then the subject area image can be automatically recognized using a deep neural network, that is, the artificial intelligence technique. In this way, the subject area image can be recognized at a higher precision, thus improving the processing effect of multi-exposure photography, solving the problem in the related art that terrible fault tolerance of a subject area of a picture may easily lead to misjudgment.

Another method for multi-exposure photography is also provided in this embodiment. The second rule involved in the method may include one of the following:

determining, according to a pre-configured alignment parameter, the alignment parameter of the subject area image corresponding to the screen touch operation;

conducting, according to a pre-configured alignment algorithm, alignment computation on the currently collected frame acquired in real time and the collected frame corresponding to the screen touch operation, to obtain the alignment parameter of the subject area image corresponding to the screen touch operation; or conducting, according to the pre-configured alignment algorithm, alignment computation the currently collected frame acquired in real time and collected frames corresponding to the historical screen touch operations, to obtain the alignment parameter of the subject area image corresponding to the screen touch operation.

The operation of determining, according to a pre-configured alignment parameter, the alignment parameter of the subject area image corresponding to the screen touch operation is equivalent to using the pre-configured alignment parameter to obtain a synthesized image with a multi-exposure photography processed effect based on the alignment operation experience. In this way, the flow of a synthesis operation can be simplified, and the efficiency of the synthesis operation can be improved.

Alignment computation is conducted, according to a pre-configured alignment algorithm, on the currently collected frame acquired in real time and the collected frame corresponding to the screen touch operation, to obtain the alignment parameter of the subject area image corresponding to the screen touch operation. The applied alignment manner is to take the collected frame corresponding to each received screen touch operation, that is, the original picture photographed each time a photography operation is triggered, as a reference to perform alignment of a currently collected frame acquired in real time, so as to obtain an image with a multi-exposure processed effect.

Alignment computation is conducted, according to the pre-configured alignment algorithm, on the currently collected frame acquired in real time and collected frames corresponding to the historical screen touch operations, to obtain the alignment parameter of the subject area image corresponding to the screen touch operation. The applied alignment manner is to take one of the frames that have been collected when receiving a screen touch operation, that is one of the photographed original pictures as a reference to perform alignment of the currently collected frame acquired in real time, so as to obtain an image with a multi-exposure processed effect.

It can be seen that, in the technical solution of this embodiment, in the process of synthesizing an image with a multi-exposure processed effect in real time, any manner of alignment may be used to conduct a synthesis operation. As described above, in this embodiment, a subject area image is recognized in real time at each screen touch operation, that is, each time a photography operation is triggered, and the accuracy of recognition is high. Therefore, with the reliability of recognizing a subject area image being guaranteed, the quality of an image with a multi-exposure processed effect synthesized in any manner of alignment can be guaranteed to a certain extent. The problems of blur and distortion, and disorder of photographed subjects caused by conducting average synthesization after the photography of multiple pictures is completed in the related art can be avoided.

Another method for multi-exposure photography is provided in this embodiment. The method also includes the following operations: receiving an editing operation initiated for the subject area image corresponding to any one or more of the historical screen touch operations; and processing, according to the editing operation, the corresponding subject area image, and taking the processed image to be an updated image with the multi-exposure processed effect.

In the technical solution of this embodiment, by means of displaying an image with a multi-exposure processed effect in real time, a user can view the effect of multi-exposure photography timely. Further, the function of adjusting the image with the multi-exposure processed effect in real time to improve the effect of a final synthesized picture is provided for the user. For example, if the effect such as the posture, expression and position of some subject area image cannot satisfy user requirements, the subject area image can be particularly processed according to an editing operation initiated by the user. This operation will not affect the other subject area images. Consequently, the user experience is improved.

Another method for multi-exposure photography is provided in this embodiment. In the method, an editing operation may include an operation of modifying the subject area image and/or an operation of deleting the subject area image.

By means of the operation of modifying the subject area image, various parameters of a specified subject area image can be modified in the image with the multi-exposure processed effect displayed in real time during multi-exposure photography. The various parameters of the subject area image may include the image position, the image size, the image pixel, the image brightness, the image transparency, etc.

Through the operation of deleting the subject area image, one or more specified subject area images may be deleted from all the recognized subject area images during multi-exposure photography.

Figure 4:
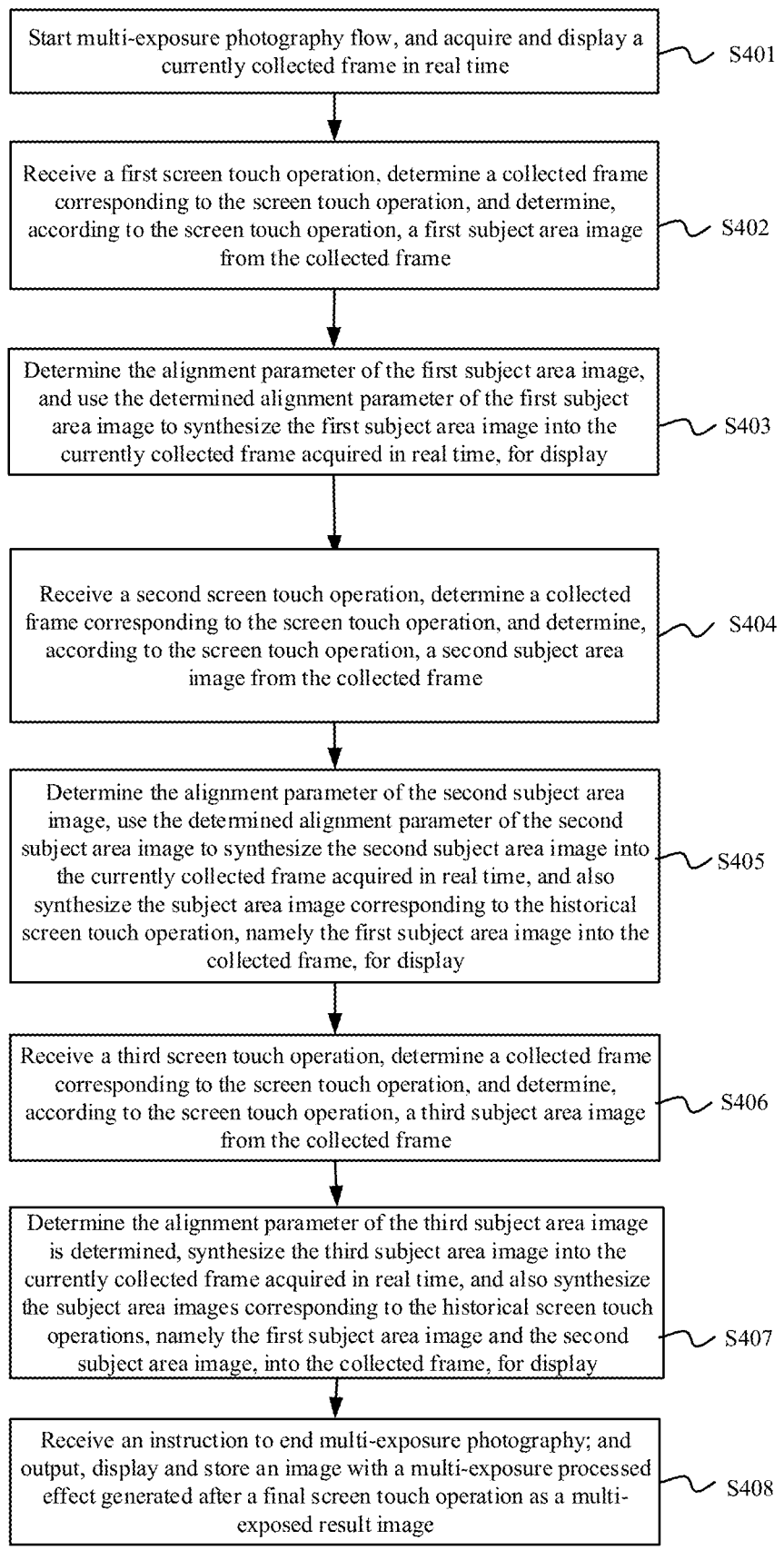
FIG. 4 illustrates a detailed flowchart of a method for multi-exposure photography according to some embodiments of the disclosure.

FIG. 4 illustrates a schematic diagram of a detailed flow of a method for multi-exposure photography according to some embodiments of the disclosure. FIG. 5 illustrates schematic diagrams of collected frames and images with a multi-exposure processed effect corresponding to screen touch operations during multi-exposure photography illustrated in FIG. 4. FIG. 6 illustrates final multi-exposed result images obtained according to the method illustrated in FIG. 4.

The process of carrying out a method for multi-exposure photography is explained in conjunction with FIG. 4 and FIG. 5. The process, as illustrated in FIG. 4, includes the following blocks.

In block S401, a multi-exposure photography flow is started, and a currently collected frame is acquired and displayed in real time.

Figure 5A:
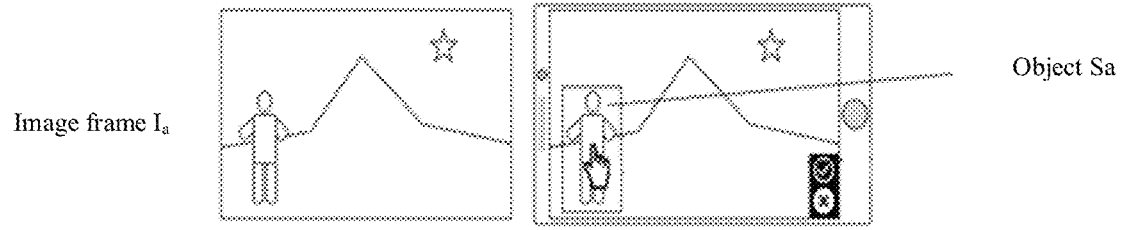
FIG. 5A illustrates a schematic diagram of a collected frame corresponding to a first received screen touch operation, and a picture displayed on a screen at the moment of the screen touch operation, according to the method for multi-exposure photography illustrated in FIG. 4.

In this block, the currently collected frame acquired in real time, as illustrated in the left part of FIG. 5A, is an actually collected original image frame.

In block S402, a screen touch operation is received for the first time, a collected frame corresponding to the screen touch operation is determined, and a first subject area image is determined from the collected frame according to the screen touch operation.

In this embodiment, the above block S402 may be carried out in the following operations.

In block S402a, a screen touch operation initiated by a user is received, and an image frame Ia at the current moment is collected.

As illustrated in the right part of FIG. 5A, the user initiates the screen touch operation by clicking a photographed human in the screen.

As illustrated in the left part of FIG. 5A, the image frame Ia of the current moment is collected to serve as an original frame, equivalent to a photographed original picture. The image frame Ia is the collected frame corresponding to the screen touch operation.

In block S402b, the image frame Ia is taken as a reference frame for alignment computation, to generate an alignment tool A.

In this block, the alignment algorithm used in the alignment computation may be preset.

In block S402c, an image area, corresponding to the screen touch operation, in the image frame Ia is determined.

In this block, a first area can be acquired around the position at which the user performs a clicking operation. The size of the first area may be configured by the system or the user. As illustrated in the right part of FIG. 5A, the first area corresponding to the user's clicking operation is the area identified with a rectangular block in the display screen. The area mapped to the image frame Ia by the first area is the image area corresponding to the screen touch operation. For simplified description, the method of determining the area mapped to the image frame Ia by the first area is explained, with the example of the display screen and the image frame Ia using a same coordinate system. The coordinate range of the first area in the coordinate system of the display screen can be first determined, and the area having the same coordinate range in the coordinate system of the image frame Ia is then confirmed to be the area mapped to the image frame Ia by the first area.

In block S402d, the pixel information and the position information of the image area corresponding to the screen touch operation are input into a deep neural network; and in the deep neural network, a subject area image in the image area is automatically predicted and is extracted as a recognized first subject area image, which can be referred to as object Sa for short.

In block S403, the alignment parameter of the first subject area image is determined, and the determined alignment parameter of the first subject area image is used to synthesize the first subject area image into the currently collected frame acquired in real time, for display.

In this embodiment, the above block S403 may be carried out in the following operations:

In block S403a, the currently collected frame I acquired in real time is aligned with the reference frame Ia by using the alignment tool A generated in block S402b, to obtain an alignment parameter Wa.

In block S403b, the object Sa, to which affine transformation has been made, is drawn, by using the alignment parameter Wa, into the currently collected frame I acquired in real time, for display.

The operation of making affine transformation to the object Sa and then drawing the transformed object into the currently collected frame I acquired in real time is equivalent to synthesizing the object Sa into the currently collected frame I acquired in real time. The image displayed at this time is an image with a multi-exposure processed effect, such as the image displayed at the right part of FIG. 5B.

In block S404, a second screen touch operation is received, a collected frame corresponding to the screen touch operation is determined, and a second subject area image is determined from the collected frame according to the screen touch operation.

In this embodiment, the above block S404 may include the following operations:

In block S404a, a screen touch operation initiated by a user is received, and an image frame Ib of the current moment is collected.

Figure 5B:
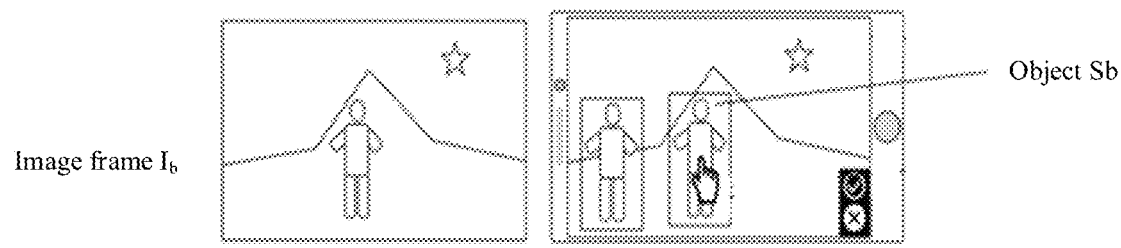
FIG. 5B illustrates a schematic diagram of a collected frame corresponding to a second received screen touch operation, and a picture displayed on the screen at the moment of the screen touch operation, according to the method for multi-exposure photography illustrated in FIG. 4.

As illustrated in the left part of FIG. 5B, the image frame Ib of the current moment is collected to serve as an original frame, equivalent to a photographed original picture. The image frame Ib is the collected frame corresponding to the screen touch operation.

As illustrated in the right part of FIG. 5B, the user may initiate the screen touch operation by clicking a photographed portrait in the screen. Since the image with the multi-exposure processed effect is displayed in the screen at this time, the image contains two photographed subjects. One of the photographed subjects is a subject to be synthesized, that is, the subject area image determined in block S402, namely the object Sa. The other is a real photographed subject, that is, the object Sb illustrated in the right part of FIG. 5B. The photographed portrait clicked by the user is the object Sb.

In block S404b, the image area in the image frame Ib corresponding to the screen touch operation is determined.

In this block, a second area can be acquired around the position at which the user performs a clicking operation. The size of the second area may be configured by the system or the user. As illustrated in the right part of FIG. 5B, the second area corresponding to the user's clicking operation is the area identified by a hand-shaped cursor with a rectangular block in the display screen. The area mapped to the image frame Ib by the second area is the image area corresponding to the screen touch operation. The principle of determining the area mapped to the image frame Ib by the second area is the same as that of determining the area mapped to the image frame Ia by the first area, which will not be described.

In block S404c, the pixel information and the position information of the image area corresponding to the screen touch operation are input into a deep neural network; and in the deep neural network, a subject area image in the image area is automatically predicted and is extracted as a recognized second subject area image, which can be referred to as object Sb for short.

In block S405, the alignment parameter of the second subject area image is determined, the determined alignment parameter of the second subject area image is used to synthesize the second subject area image into the currently collected frame acquired in real time, and the subject area image corresponding to the historical screen touch operation, namely the first subject area image, is also synthesized into the collected frame, for display.

In this embodiment, the above block S405 may include the following operations.

In block S405a, the currently collected frame I acquired in real time is aligned with the reference frame Ia by using the alignment tool A generated in block S402b, to obtain an alignment parameter Wa_b.

In block S405b, the object Sa, to which affine transformation has been made, is drawn, by using the alignment parameter Wa obtained in block S403a, into the currently collected frame I acquired in real time.

In block S405c, the object Sb, to which affine transformation has been made, is drawn, by using the alignment parameter Wa×Wa_b−1 (that is, the inverse matrix of the alignment parameter Wa_b), into the currently collected frame I acquired in real time, for display.

The drawing operations in blocks S405b and S405c are to draw the object Sa and the object Sb into the same collected frame. The image displayed at this time is an image with a multi-exposure processed effect, such as the image displayed at the right part of FIG. 5C.

In block S406, a third screen touch operation is received, a collected frame corresponding to the screen touch operation is determined, and a third subject area image is determined from the collected frame according to the screen touch operation.

In this embodiment, for the operations in the above block S406, reference can be made to the operations in the above block S404, which will not be described. When a screen touch operation initiated by a user is received, an image frame Ic of the current moment is collected, as illustrated in the left part of FIG. 5C. As illustrated in the right part of FIG. 5C, the screen touch operation initiated by the user is targeted at the subject area image, that is, the actually photographed portrait Sc. The object Sc is the third subject area image determined in this embodiment.

In block S407, the alignment parameter of the third subject area image is determined, the third subject area image is synthesized into the currently collected frame acquired in real time, and the subject area images corresponding to the historical screen touch operations, namely the first subject area image and the second subject area image, are also synthesized into the collected frame, for display.

In this embodiment, the above block S407 may include the following operations:

In block S407a, the currently collected frame I acquired in real time is aligned with the reference frame Ia by using the alignment tool A generated in block S402b, to obtain an alignment parameter Wa_c.

In block S407b, the object Sa, to which affine transformation has been made, is drawn, by using the alignment parameter Wa obtained in block S403a, into the currently collected frame I acquired in real time.

In block S407c, the object Sb, to which affine transformation has been made, is drawn, by using the alignment parameter Wa_b obtained in block S405a, into the currently collected frame I acquired in real time.

In block S407d, the object Sc, to which affine transformation has been made, is drawn, by using the alignment parameter Wa×Wa_c−1 (that is, the inverse matrix of the alignment parameter Wa_c), into the currently collected frame I acquired in real time, for display.

The drawing operations in blocks S407b, S407c and S407d are to draw the object Sa, the object Sb and the object Sc into the same collected frame. The image displayed at this time is an image with a multi-exposure processed effect.

In block S408, an instruction to end multi-exposure photography is received, and an image with a multi-exposure processed effect generated after a final screen touch operation is output, displayed and stored as a multi-exposed result image.

The image with the multi-exposure processed effect corresponding to the final screen touch operation may be obtained by synthesizing the subject area image corresponding to the final screen touch operation and the subject area images corresponding to all the historical screen touch operations into the collected frame acquired at the moment of receiving the final screen touch operation. The image with the multi-exposure processed effect corresponding to the final screen touch operation may also be obtained by synthesizing the subject area image corresponding to the final screen touch operation and the subject area images corresponding to all the historical screen touch operations into the collected frame acquired at the moment of receiving the instruction to end multi-exposure photography.

Figure 5C:
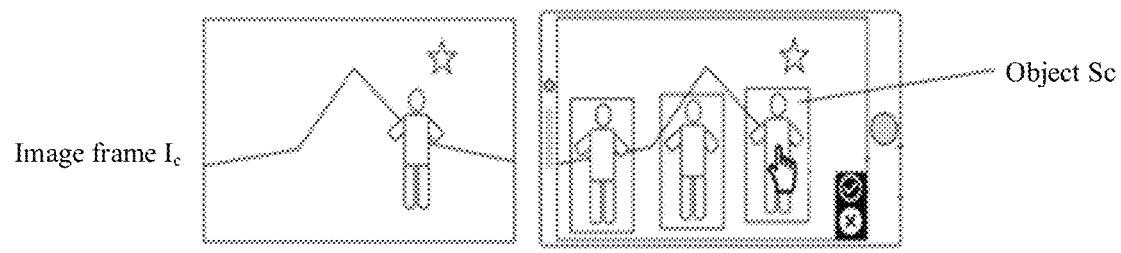
FIG. 5C illustrates a schematic diagram of a collected frame corresponding to a third received screen touch operation, and a picture displayed on the screen at the moment of the screen touch operation, according to the method for multi-exposure photography illustrated in FIG. 4.
Figure 5D:
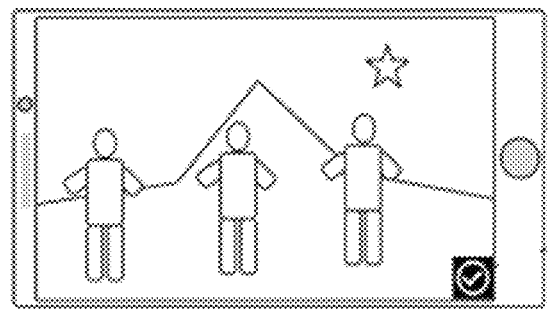
FIG. 5D illustrates a multi-exposed result picture generated according to the method for multi-exposure photography illustrated in FIG. 4.
Figure 6A:
FIG. 6A illustrates a multi-exposed result picture generated according to the method for multi-exposure photography illustrated in FIG. 4.
Figure 6B:
FIG. 6B illustrates another multi-exposed result picture generated according to the method for multi-exposure photography illustrated in FIG. 4.

In this block, when the user confirms that all the pictures have been added completely and clicks the complete button as illustrated in the left part of FIG. 5C, the instruction to end multi-exposure photography is received. The generated multi-exposed result image is as illustrated in FIG. 5D. With actually photographed pictures as an example, the multi-exposed result images generated according to the above method are as illustrated in FIG. 6. FIG. 6A and FIG. 6B are multi-exposed pictures finally generated after photography in two scenes. It can be seen therefrom that in the same scene, the photographed subjects (that is, the child) extracted from different pictures are synthesized into the same picture at different positions, reaching the interesting effect of the same picture containing multiple doppelgangers of the same person.

In addition, during photography according to the above method for multi-exposure photography, the image with the multi-exposure processed effect displayed in real time provides the user with the function of previewing a multi-exposure processed effect in real time. Therefore, the user can modify the image with the multi-exposure processed effect in real time as required. That is to say, on the basis of the above method, an editing operation initiated by the user for one or more subject area images in the image with the multi-exposure processed effect can also be received. The subject area image selected by the user is correspondingly processed according to the editing operation, and the processed image is updated to be an image with a multi-exposure processed effect. For example, when the received editing operation is an operation of deleting the subject area image, the remaining subject area images among all the subject area images other than the deleted subject area image can be synthesized into the currently collected frame acquired in real time, for display. The synthesized image obtained is an updated image with the multi-exposure processed effect.

Figure 7:
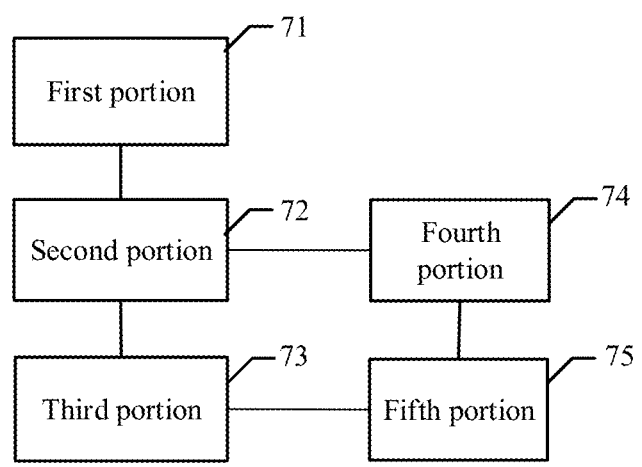
FIG. 7 illustrates a block diagram of an apparatus for multi-exposure photography according to some embodiments of the disclosure.

FIG. 7 illustrates a block diagram of an apparatus for multi-exposure photography according to some embodiments of the disclosure. As illustrated in FIG. 7, the apparatus includes a first portion 71, a second portion 72, a third portion 73, a fourth portion 74 and a fifth portion 75.

The first portion 71 is configured to receive a screen touch operation, determine a collected frame corresponding to the screen touch operation, determine, according to a first rule, a subject area image corresponding to the screen touch operation from the collected frame corresponding to the screen touch operation, and determine, according to a second rule, an alignment parameter of the subject area image corresponding to the screen touch operation.

The second portion 72 is configured to acquire a currently collected frame in real time.

The third portion 73 is configured to: when determining that the screen touch operation is the first received screen touch operation, synthesize, according to the alignment parameter of the subject area image corresponding to the screen touch operation, the subject area image corresponding to the screen touch operation into the currently collected frame, take the synthesized image to be an image with a multi-exposure processed effect and display the image with the multi-exposure processed effect.

The fourth portion 74 is configured to: when determining that the screen touch operation is not the first received screen touch operation, synthesize, according to corresponding alignment parameters, the subject area image corresponding to the screen touch operation and subject area images corresponding to all historical screen touch operations into the currently collected frame, take the synthesized image to be the image with the multi-exposure processed effect and display the image with the multi-exposure processed effect.

The fifth portion 75 is configured to determine an image with a multi-exposure processed effect from the images with the multi-exposure processed effect, which are generated after a final screen touch operation, to be a multi-exposed result image.

Another apparatus for multi-exposure photography is provided in this embodiment. The first rule includes: determining the subject area image corresponding to the screen touch operation according to at least one of the screen touch operation or an object image segmentation approach.

Another apparatus for multi-exposure photography is provided in this embodiment. The first portion 71 may include a first sub-portion, a second sub-portion and a third sub-portion.

The first sub-portion is configured to determine an image area corresponding to the screen touch operation from the collected frame corresponding to the screen touch operation.

The second sub-portion is configured to input position information and image information contained in the image area into a deep neural network.

The third sub-portion is configured to recognize the subject area image from the image area by means of the deep neural network.

Another apparatus for multi-exposure photography is provided in this embodiment. The second rule may include one of the following: determining, according to a pre-configured alignment parameter, the alignment parameter of the subject area image corresponding to the screen touch operation; conducting, according to a pre-configured alignment algorithm, alignment computation on the currently collected frame acquired in real time and the collected frame corresponding to the screen touch operation, to obtain the alignment parameter of the subject area image corresponding to the screen touch operation; or conducting, according to the pre-configured alignment algorithm, alignment computation on the currently collected frame acquired in real time and collected frames corresponding to the historical screen touch operations, to obtain the alignment parameter of the subject area image corresponding to the screen touch operation.

Another apparatus for multi-exposure photography is provided in this embodiment. The apparatus may further include a sixth portion and a seventh portion.

The sixth portion is configured to receive an editing operation initiated for the subject area image corresponding to any one or more of the historical screen touch operations.

The seventh portion is configured to process, according to the editing operation, the corresponding subject area image, take the processed image to be an updated image with the multi-exposure processed effect and display the updated image with the multi-exposure processed effect.

Another apparatus for multi-exposure photography is provided in this embodiment. An editing operation involved in the apparatus may include an operation of modifying the subject area image and/or an operation of deleting the subject area image.

With regard to the apparatus in the above embodiments, the specific way for the various portions to execute operations has been described in detail in the embodiments regarding the method, which will not be described in detail here.

In some embodiments of the disclosure, an apparatus for multi-exposure photography is provided, including a processor and a memory configured to store instructions executable by the processor. The processor is configured to:

receive a screen touch operation, determine a collected frame corresponding to the screen touch operation, determine, according to a first rule, a subject area image corresponding to the screen touch operation from the collected frame corresponding to the screen touch operation, and determine, according to a second rule, an alignment parameter of the subject area image corresponding to the screen touch operation;

acquire a currently collected frame in real time;

when determining that the screen touch operation is the first received screen touch operation, synthesize, according to the alignment parameter of the subject area image corresponding to the screen touch operation, the subject area image corresponding to the screen touch operation into the currently collected frame, take the synthesized image to be an image with a multi-exposure processed effect and display the image with the multi-exposure processed effect; or when determining that the screen touch operation is not the first received screen touch operation, synthesize, according to corresponding alignment parameters, the subject area image corresponding to the screen touch operation and subject area images corresponding to all historical screen touch operations into the currently collected frame, take the synthesized image to be the image with the multi-exposure processed effect, and display the image with the multi-exposure processed effect; and determine an image with a multi-exposure processed effect from the images with the multi-exposure processed effect, which are generated after a final screen touch operation, to be a multi-exposed result image.

With regard to the apparatus in the above embodiments, the specific way for the various parts to execute operations has been described in detail in the embodiments regarding the method, which will not be described in detail here.

In some embodiments of the disclosure, a non-transitory computer-readable storage medium is provided, wherein instructions in the storage medium, when executed by a processor of a mobile terminal, may enable the mobile terminal to execute a method for multi-exposure photography, including:

receiving a screen touch operation, determine a collected frame corresponding to the screen touch operation, determine, according to a first rule, a subject area image corresponding to the screen touch operation from the collected frame corresponding to the screen touch operation, and determine, according to a second rule, an alignment parameter of the subject area image corresponding to the screen touch operation;

acquiring a currently collected frame in real time;

when determining that the screen touch operation is the first received screen touch operation, synthesizing, according to the alignment parameter of the subject area image corresponding to the screen touch operation, the subject area image corresponding to the screen touch operation into the currently collected frame, taking the synthesized image to be an image with a multi-exposure processed effect and displaying the image with the multi-exposure processed effect; or when determining that the screen touch operation is not the first received screen touch operation, synthesizing, according to corresponding alignment parameters, the subject area image corresponding to the screen touch operation and subject area images corresponding to all historical screen touch operations into the currently collected frame, taking the synthesized image to be the image with the multi-exposure processed effect, and displaying the image with the multi-exposure processed effect; and determining an image with a multi-exposure processed effect from the images with the multi-exposure processed effect, which are generated after a final screen touch operation, to be a multi-exposed result image.

The specific way for each of the instructions in the storage medium in the above embodiments to execute an operation has been described in detail in the embodiments regarding the method, which will not be described in detail here.

Various embodiments of the present disclosure can have one or more of the following advantages.

During multi-exposure photography, an image synthesis operation can be conducted in real time and a multi-exposure synthesis effect can be displayed, according to a screen touch operation initiated by a user. A real-time preview function can therefore be realized, which is more convenient, quicker and more intuitive, improves user experience.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

In some embodiments, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for multi-exposure photography, comprising:
   receiving a screen touch operation;
   determining a collected frame corresponding to the screen touch operation;
   determining, according to a first rule, a subject area image corresponding to the screen touch operation from the collected frame corresponding to the screen touch operation;
   determining, according to a second rule, an alignment parameter of the subject area image corresponding to the screen touch operation;
   acquiring a currently collected frame in real time;
   upon determining that the screen touch operation is the first received screen touch operation, synthesizing, according to the alignment parameter of the subject area image corresponding to the screen touch operation, the subject area image corresponding to the screen touch operation into the currently collected frame, taking the synthesized image to be an image with a multi-exposure processed effect and displaying the image with the multi-exposure processed effect; and
   when determining that the screen touch operation is not the first received screen touch operation, synthesizing, according to corresponding alignment parameters, the subject area image corresponding to the screen touch operation and subject area images corresponding to all historical screen touch operations into the currently collected frame, taking the synthesized image to be the image with the multi-exposure processed effect and displaying the image with the multi-exposure processed effect; and
   determining an image with a multi-exposure processed effect from the images with the multi-exposure processed effect, which are generated after a final screen touch operation, to be a multi-exposed result image.

2. The method according to claim 1, wherein the first rule comprises:
   determining the subject area image corresponding to the screen touch operation according to at least one of the screen touch operation or an object image segmentation approach.

3. The method according to claim 2, wherein the determining the subject area image corresponding to the screen touch operation according to the screen touch operation and the object image segmentation approach comprises:
   determining an image area corresponding to the screen touch operation from the collected frame corresponding to the screen touch operation;
   inputting position information and image information contained in the image area into a deep neural network; and
   recognizing the subject area image from the image area by means of the deep neural network.

4. The method according to claim 1, wherein the second rule comprises one of the following:
   determining, according to a pre-configured alignment parameter, the alignment parameter of the subject area image corresponding to the screen touch operation;
   conducting, according to a pre-configured alignment algorithm, alignment computation on the currently collected frame acquired in real time and the collected frame corresponding to the screen touch operation, to obtain the alignment parameter of the subject area image corresponding to the screen touch operation; or
   conducting, according to the pre-configured alignment algorithm, alignment computation on the currently collected frame acquired in real time and collected frames corresponding to the historical screen touch operations, to obtain the alignment parameter of the subject area image corresponding to the screen touch operation.

5. The method according to claim 1, further comprising:
   receiving an editing operation initiated for the subject area image corresponding to any one or more of the historical screen touch operations;
   processing, according to the editing operation, the corresponding subject area image;
   taking the processed image to be an updated image with the multi-exposure processed effect; and
   displaying the updated image with the multi-exposure processed effect.

6. The method according to claim 5, wherein the editing operation at least comprises at least one of:
   an operation of modifying the subject area image; or
   an operation of deleting the subject area image.

7. An apparatus for multi-exposure photography, comprising:
   a processor; and
   a memory, configured to store instructions executable by the processor,
   wherein the processor is configured to:
   receive a screen touch operation;

determine a collected frame corresponding to the screen touch operation;

determine, according to a first rule, a subject area image corresponding to the screen touch operation from the collected frame corresponding to the screen touch operation;

determine, according to a second rule, an alignment parameter of the subject area image corresponding to the screen touch operation;

acquire a currently collected frame in real time;

upon determining that the screen touch operation is the first received screen touch operation, synthesize, according to the alignment parameter of the subject area image corresponding to the screen touch operation, the subject area image corresponding to the screen touch operation into the currently collected frame, take the synthesized image to be an image with a multi-exposure processed effect and display the image with the multi-exposure processed effect; and when determining that the screen touch operation is not the first received screen touch operation, synthesize, according to corresponding alignment parameters, the subject area image corresponding to the screen touch operation and subject area images corresponding to all historical screen touch operations into the currently collected frame, take the synthesized image to be the image with the multi-exposure processed effect and display the image with the multi-exposure processed effect; and determine an image with a multi-exposure processed effect from the images with the multi-exposure processed effect, which are generated after a final screen touch operation, to be a multi-exposed result image.

8. The apparatus according to claim 7, wherein the first rule comprises:
  determining the subject area image corresponding to the screen touch operation according to at least one of the screen touch operation or an object image segmentation approach.

9. The apparatus according to claim 8, wherein in order to determine the subject area image corresponding to the screen touch operation according to the screen touch operation and the object image segmentation approach, the processor is configured to:
  determine an image area corresponding to the screen touch operation from the collected frame corresponding to the screen touch operation;
  input position information and image information contained in the image area into a deep neural network; and
  recognize the subject area image from the image area by means of the deep neural network.

10. The apparatus according to claim 7, wherein the second rule comprises one of:
  determining, according to a pre-configured alignment parameter, the alignment parameter of the subject area image corresponding to the screen touch operation;
  conducting, according to a pre-configured alignment algorithm, alignment computation on the currently collected frame acquired in real time and the collected frame corresponding to the screen touch operation, to obtain the alignment parameter of the subject area image corresponding to the screen touch operation; or
  conducting, according to the pre-configured alignment algorithm, alignment computation on the currently collected frame acquired in real time and collected frames corresponding to the historical screen touch operations, to obtain the alignment parameter of the subject area image corresponding to the screen touch operation.

11. The apparatus according to claim 7, wherein the processor is further configured to:
  receive an editing operation initiated for the subject area image corresponding to any one or more of the historical screen touch operations;
  process, according to the editing operation, the corresponding subject area image;
  take the processed image to be an updated image with the multi-exposure processed effect; and
  display the updated image with the multi-exposure processed effect.

12. The apparatus according to claim 11, wherein the editing operation at least comprises at least one of:
  an operation of modifying the subject area image; or
  an operation of deleting the subject area image.

13. A non-transitory computer-readable storage medium having stored therein instructions that, when executed by a processor of a mobile terminal, cause the mobile terminal to perform a method for multi-exposure photography, comprising:
  receiving a screen touch operation;
  determining a collected frame corresponding to the screen touch operation;
  determining, according to a first rule, a subject area image corresponding to the screen touch operation from the collected frame corresponding to the screen touch operation;
  determining, according to a second rule, an alignment parameter of the subject area image corresponding to the screen touch operation;
  acquiring a currently collected frame in real time;
  when determining that the screen touch operation is the first received screen touch operation, synthesizing, according to the alignment parameter of the subject area image corresponding to the screen touch operation, the subject area image corresponding to the screen touch operation into the currently collected frame, taking the synthesized image to be an image with a multi-exposure processed effect and displaying the image with the multi-exposure processed effect; and when determining that the screen touch operation is not the first received screen touch operation, synthesizing, according to corresponding alignment parameters, the subject area image corresponding to the screen touch operation and subject area images corresponding to all historical screen touch operations into the currently collected frame, taking the synthesized image to be the image with the multi-exposure processed effect and displaying the image with the multi-exposure processed effect; and
  determining an image with a multi-exposure processed effect from the images with the multi-exposure processed effect, which are generated after a final screen touch operation, to be a multi-exposed result image.

14. The non-transitory computer-readable storage medium according to claim 13, wherein the first rule comprises:
  determining the subject area image corresponding to the screen touch operation according to at least one of the screen touch operation or an object image segmentation approach.

15. The non-transitory computer-readable storage medium according to claim 14, wherein determining the subject area image corresponding to the screen touch operation according to the screen touch operation and the object image segmentation approach comprises:

determining an image area corresponding to the screen touch operation from the collected frame corresponding to the screen touch operation;
inputting position information and image information contained in the image area into a deep neural network; and
recognizing the subject area image from the image area by means of the deep neural network.

16. The non-transitory computer-readable storage medium according to claim 13, wherein the second rule comprises one of the following:
determining, according to a pre-configured alignment parameter, the alignment parameter of the subject area image corresponding to the screen touch operation;
conducting, according to a pre-configured alignment algorithm, alignment computation on the currently collected frame acquired in real time and the collected frame corresponding to the screen touch operation, to obtain the alignment parameter of the subject area image corresponding to the screen touch operation; or
conducting, according to the pre-configured alignment algorithm, alignment computation on the currently collected frame acquired in real time and collected frames corresponding to the historical screen touch operations, to obtain the alignment parameter of the subject area image corresponding to the screen touch operation.

17. The non-transitory computer-readable storage medium according to claim 13, wherein the method further comprises:
receiving an editing operation initiated for the subject area image corresponding to any one or more of the historical screen touch operations;
processing, according to the editing operation, the corresponding subject area image;
taking the processed image to be an updated image with the multi-exposure processed effect; and
displaying the updated image with the multi-exposure processed effect.

18. The non-transitory computer-readable storage medium according to claim 17, wherein the editing operation at least comprises at least one of:
an operation of modifying the subject area image; or
an operation of deleting the subject area image.

19. A mobile terminal implementing the method according to claim 1, comprising a touch screen configured, wherein the mobile terminal is configured to perform an image synthesis operation in real time, and the touch screen is configured to display a multi-exposure synthesis effect according to the screen touch operation.

20. The mobile terminal according to claim 19, wherein the mobile terminal has a real-time preview function with the multi-exposure synthesis effect.

* * * * *